(No Model.) 4 Sheets—Sheet 1.

J. LA DOW.
PERPETUAL COTTON OR HAY PRESS.

No. 365,824. Patented July 5, 1887.

WITNESSES
Geo. W. Young
Hey. A. Lamb

INVENTOR
John La Dow.
By his Attorneys
Janney & Skinkle

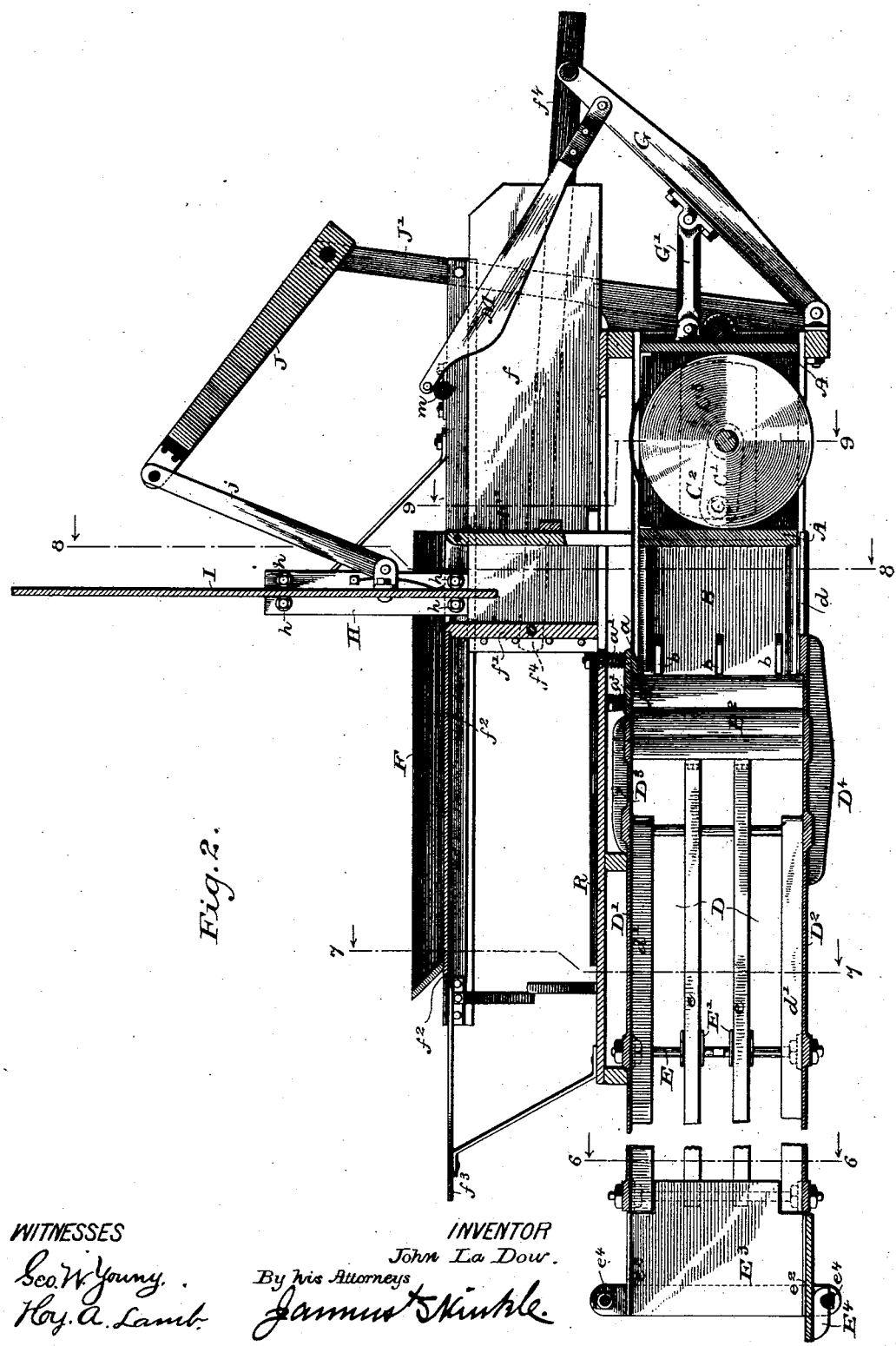

(No Model.) 4 Sheets—Sheet 3.

J. LA DOW.
PERPETUAL COTTON OR HAY PRESS.

No. 365,824. Patented July 5, 1887.

WITNESSES
Geo. W. Young.
Hy. A. Lamb.

INVENTOR
John La Dow.
By his Attorneys
James Kruhle.

N. PETERS, Photo-Lithographer, Washington, D. C.

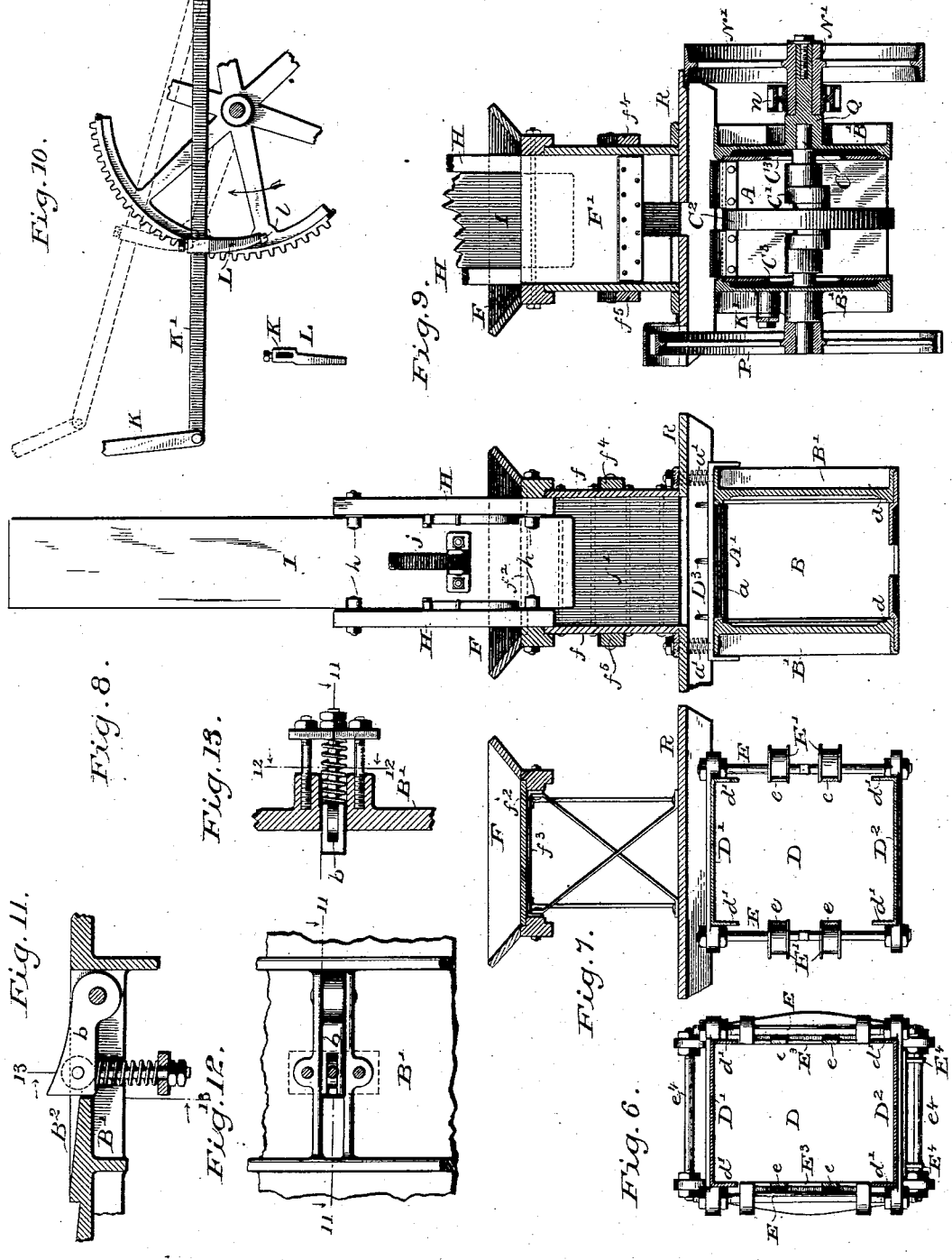

UNITED STATES PATENT OFFICE.

JOHN LA DOW, OF TRUMANSBURG, NEW YORK, ASSIGNOR TO GREGG & CO., OF SAME PLACE.

PERPETUAL COTTON AND HAY PRESS.

SPECIFICATION forming part of Letters Patent No. 365,824, dated July 5, 1887.

Application filed February 5, 1886. Serial No. 190,920. (No model.)

*To all whom it may concern:*

Be it known that I, JOHN LA DOW, a citizen of the United States, residing at Trumansburg, in the county of Tompkins and State of New York, have invented certain new and useful Improvements in Perpetual Cotton and Hay Presses, of which the following is a specification, reference being had therein to the accompanying drawings.

The present invention relates to improvements in perpetual cotton and hay presses; and it consists in various combinations of elements and arrangements of parts whereby I am enabled to use iron to a very great extent in the construction of the apparatus, and great efficiency, strength, and ease of operation are secured, as will be fully hereinafter set forth.

Figures 1, 14:
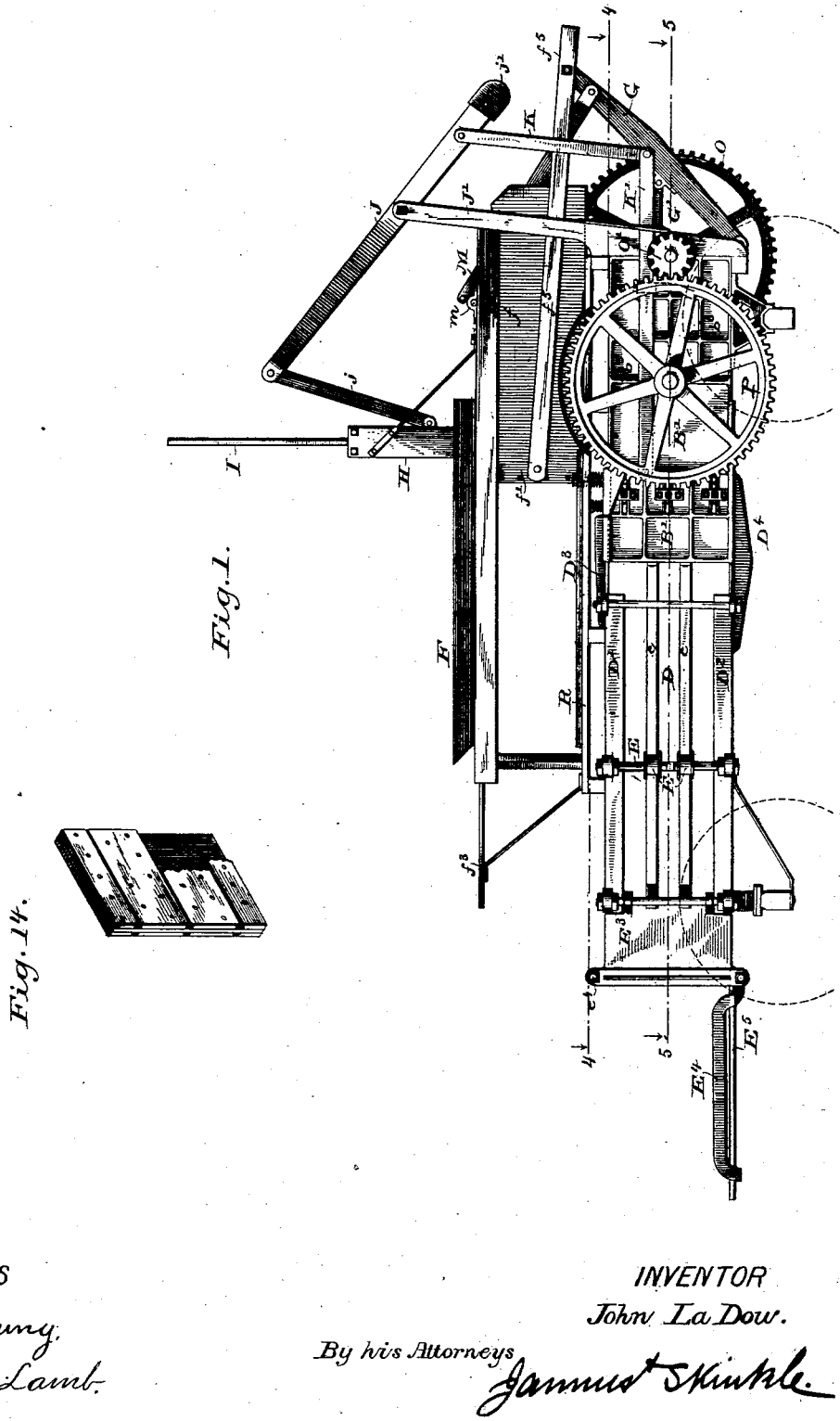
Figure 3:
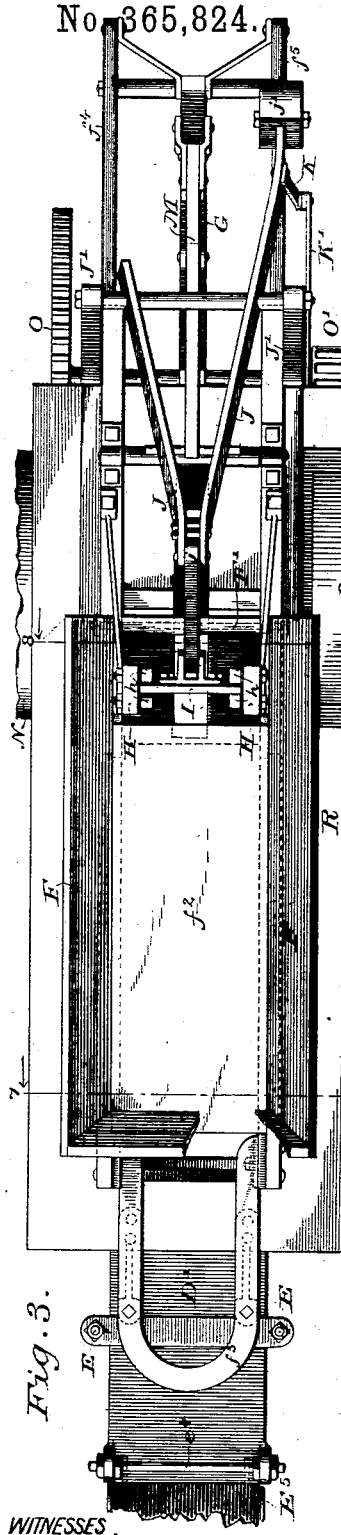
Figure 4:
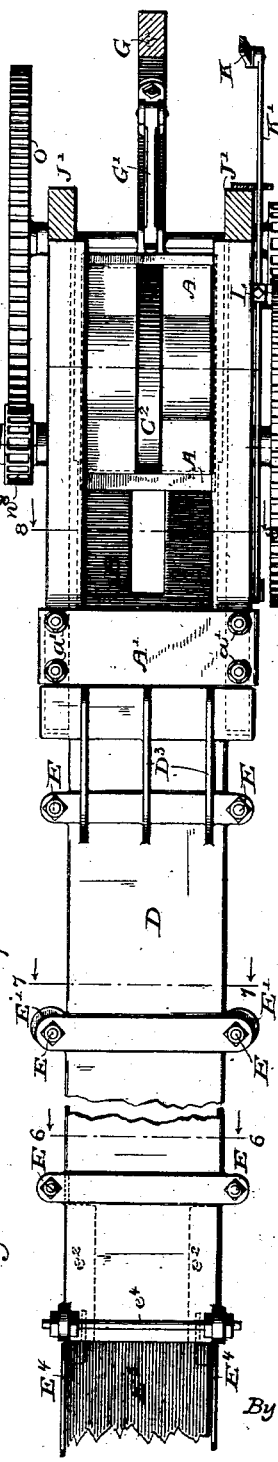
Figure 5:
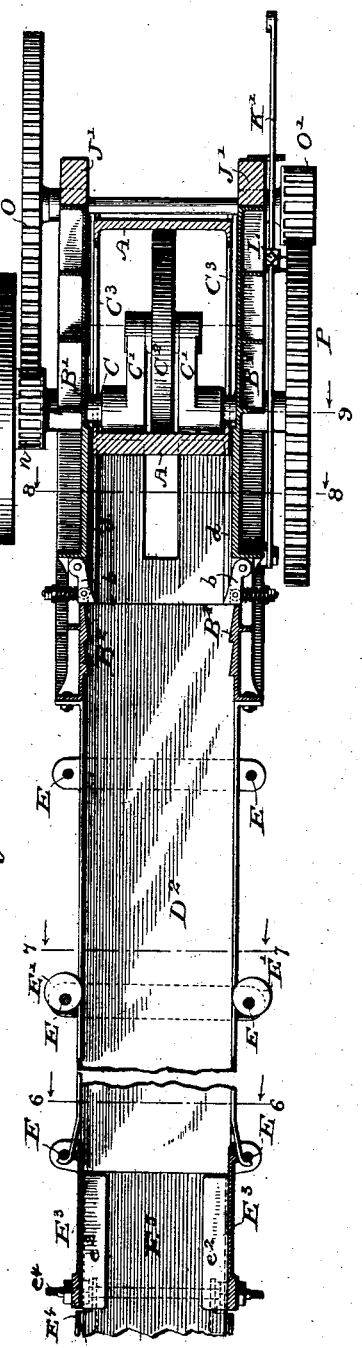

In the accompanying drawings, Figure 1 is a side elevation showing the general arrangement of a hay-press constructed according to my invention. Fig. 2 is a vertical sectional elevation thereof. Fig. 3 is a top plan view. Fig. 4 is a plan view of the apparatus on the line 4 4 of Fig. 1, the hopper and feeding mechanism being removed. Fig. 5 is a plan view taken horizontally through the center of the compression and friction chambers. Fig. 6 is a sectional view on the line 6 6 of Fig. 2. Fig. 7 is a similar view on the line 7 7 of Fig. 2. Fig. 8 is a section on the line 8 8 of Fig. 2. Fig. 9 is a view taken on the line 9 9 of Fig. 2. Fig. 10 is a detail showing one of the driving-wheels and the means for actuating the feed mechanism. Figs. 11, 12, and 13 are details showing a portion of the top of the friction-chamber and part of the mechanism for retaining the compressed charge. Fig. 14 shows the dividing-board, which is placed between the material for one bale and that being accumulated for the succeeding one in the friction-chamber.

Similar letters denote like parts.

As indicated in the drawings, the apparatus, as a whole, consists of a long narrow chamber surmounted by a hopper and the necessary feeding devices, and is usually mounted upon wheels for ease of transportation. This chamber is provided at one end with a reciprocated piston or follower and devices for retaining the charge last compressed, and its other portion is capable of contraction to any desired extent, whereby a sufficiently great frictional resistance is opposed to the passage through the chamber of the material, under the action of the follower, to cause the compression of the charges forced thereinto by the feeding devices.

A is the follower, and B is the compression-chamber—that portion of the longitudinal chamber within which it is reciprocated—which is composed of the ribbed metallic side pieces, B'. These pieces are re-enforced by ribs $b^2$ on their outer sides and suitably recessed along their upper and lower interior edges to form guides for the rectangular follower A, within which is contained the crank-shaft C, crank C', and anti-friction wheel $C^2$. The follower is longitudinally slotted, as indicated at $C^3$, in order to permit the desired range of movement in the crank. In the remaining portion of the elongated box, the rear end of which constitutes the compression-chamber, is a friction-chamber, D, leading therefrom, and is formed of a strong metallic top piece, D', which extends to the end of the compression-chamber, and a strong bottom piece, $D^2$, which extends somewhat beyond the end of the compression-chamber, as shown at d, where it is provided with a suitable slit or slits to allow the escape of dust and trash. The top and bottom pieces are formed with inwardly-extending flanges d', and the said top and bottom portions are united and held in position by screw-threaded vertical rods E, which are provided with inside and outside nuts and suitable cross-pieces, by means of which the entire upper and lower portions of the friction-chamber may be brought nearer to or moved farther from each other, and the interior dimensions of the chamber increased or decreased, as desired. The rods E are secured in position by means of the nuts referred to, and a suitable flat portion is formed on each to receive a wrench by which they and the eccentrics are then rotated into the desired position.

The sides of the chamber D are formed of two or more flat iron bars, e, which are secured at one end to the side walls of the compression-chamber or the forward brace-rod, and at the other to the last one of the side brace-rods, E, thus forming open sides to a very strong metallic chamber, through which the material being baled must pass.

In order to more evenly distribute the frictional resistance necessary to produce the required compression, I furnish one or more of the side rods, E, with eccentrics E', which bear against the side rails, e, and by means of which said side rails may be forced inward and the dimensions of the friction-chamber adjusted as desired. The flanges $d'$, extending inward from the top and bottom pieces, do not extend the entire length of the said pieces, but terminate at or near the forward brace-rod, from which point and beyond the said pieces D' D² are formed with ribs D³ D⁴, which give extra strength to that portion of the chamber. When it is desired to cover the material being compressed with sacking, the side bars, e, also terminate at the forward brace-rod, they being there secured, as at their other ends, and an opening is formed on each side of the friction-chamber, through which the fabric used to protect the baled material may be continuously fed.

In addition to the guideways for the follower, the side pieces, B, are formed with two or more vertical steps or recesses, B², at their forward extremities, which steps, being alike on both sides and of a depth about equal to the thickness of one of the compressed charges, receive the edges of each succeeding charge, and serve, in connection with other devices, to retain them until forced away from said point by the continued operation of the machine. Inwardly-projecting spring-catches $b$ are also mounted in suitable slots in the sides B', which catches are forced outward by the passage of the material and return to their normal position when the follower is at the end of its forward movement, and thus automatically secure the charge last compressed. A supplemental plate, A', formed with an inwardly-projecting edge, $a$, is placed across the top of the front end of the compression-chamber, where it is securely held upon guide-pins provided with springs $a'$, which press it vertically downward into the chamber and cause it to co operate with the spring-catches in the sides B'.

Above the compression and friction chambers, and secured upon suitable supports, is a receiver or hopper, F, the front end, F', of which is firmly fixed at a point above the rearward position of the front end of the follower. Below this hopper and mounted on suitable guides is located a box consisting of side pieces, $f$, and an end, $f'$. This box constitutes the condenser, and is moved back and forth beneath the hopper at each reciprocation of the follower, being connected thereto by the pitmen $f^4$ $f^5$, which are secured to the lower portion of the frame and connected to the follower by the rod G'. The condenser is provided with a rearwardly-extending board, $f^2$, which forms a bottom for the hopper when the condenser is in its forward position, and slides rearward with the movement of the condenser, and is then supported upon the bracket $f^3$, placed in the rear of the hopper for its support. Material to be compressed is thrown loosely into the hopper and falls into the condensing-box or upon the board $f^2$, from which it falls into the condenser, and is by its next forward movement concentrated between the end $f''$ and the bulk-head F', forming a charge ready to be fed into the compression-chamber. At the front end of the hopper, and directly above the condensing and compression chambers, is fixed an upright, H, which is provided with two or more sets of guide-rollers, $h$, between which is mounted the feeder-board I. A walking-beam, J, is mounted upon an upright, J', secured in any convenient manner to the rear end of the machine, the long arm of which is connected to the feeder by means of a link, $j$, through which the necessary vertical motion is imparted thereto. The opposite end of the walking-beam is provided with a counter-weight, $j'$, and is, by means of pitman K, connected to a pivoted arm, K', which extends along the compression-chamber, and is provided with an adjustable lug or projection, L, extending into the path of a projection, $l$, near the periphery of one of the main wheels P, by means whereof, at each movement of the follower, the walking-beam is raised, the feeder depressed, and the condensed charge forced from the condensing into the compressing chamber. The counter-weight $j'$ is usually sufficient to return the walking-beam to its normal position and raise the feeder; but in order to secure this result under all circumstances an arm, M, is pivotally attached to the rock-arm G, its free end resting upon a suitable roller, $m$. The upper end of the arm M is curved, so that when forced forward by the movement of the arm G the extremity thereof will also move upward. Being attached to the arm which operates the condenser, the free end of the arm M will be at its lowest point when the walking-beam performs its function, and in case of the failure of the counter-weight to quickly return it to its first position the arm M will strike it as the condenser moves forward, throwing it upward and out of the way of the follower.

In addition to the hereinbefore-described means for contracting the friction-chamber itself, I provide gates E³ at the extremity of the friction-chamber, which gates may be opened or closed to a sufficient extent by means of the screw-threaded transverse bolts $e^4$, and the resistance to the exit of the compressed material modified according to circumstances. In order to prevent a bale from dropping or pulling itself out before being entirely ejected by its successor, and the wires broken or damaged by the additional and injurious side strain received just before falling, I provide the gates E³ with flanges $e^2$, extending inward from their lower edges, the upper surface of said flanges being substantially on a level with the bottom of the friction-chamber. An iron frame, $E^4$, extends forward endwise from the said gate, and is securely mounted upon the lower screw-bolt, $e^4$, by which the gates themselves are adjusted. A plank, $E^5$, is laid upon the frame $E^4$, and its inner end pushed under the flange $e^3$, thus forming a simple and convenient detachable support for the bales as they issue from the friction-chamber.

In Fig. 14 is shown a simple form of follower-board, which is interposed between the material for each bale, being placed in the compression-chamber each time the desired number of layers have been compressed, and it will be readily understood how, in connection with the open sides of the friction-chamber, the wires can be placed as the operation continues and the compressed bales continuously removed from the delivery end of the machine.

The power necessary to actuate the various parts of the machine is applied to a belt-wheel, N, which wheel is provided with a hub, N', mounted upon a fixed spindle suitably supported upon the side of the compression-chamber. The hub N' also carries a pinion, $n$. The pinion $n$ meshes with and actuates the gear-wheel O, the axis of which passes through the frame-work of the machine, and is provided at its opposite end with a pinion, O', which meshes with a second gear-wheel, P, which is mounted upon the crank-shaft C, which said shaft extends into and through the follower A, and has a bearing in a projection, Q, on the opposite side of the compression-chamber.

A platform, R, extends around the sides and rear of the hopper, and constitutes a safe and convenient stand for the operator.

Without claiming a friction-chamber formed with laterally-adjustable sides, in combination with cams or eccentrics bearing against the sides, the eccentrics being on rods, whereby the frictional resistance to the bale is controlled, what I do claim, and desire to secure by Letters Patent, is—

1. The combination of the compressing-chamber, the condensing-chamber above it, a vertically-moving feeder-board, I, supports H therefor, a walking-beam, and connections between the walking-beam and the feeder and between the walking-beam and one of the main driving-wheels, provided with a projection whereby the said feeder is forced upward at each revolution of the machine, substantially as described.

2. In a perpetual press, the combination, with the condensing chamber, a condenser, the follower, an arm mounted upon a stationary pivot and connected to the follower by a suitable link, of a feeder, a walking-beam, and connections for positively operating said feeder, and an additional arm located in the path of the walking-beam and adapted to force it upward at the commencement of the forward movement of the follower, as set forth.

3. The combination of the condensing-chamber, a suitable condenser, the follower, an arm mounted upon a stationary pivot at one end and connected to the follower by a suitable link and at its free end to the pitmen $f^4$ $f^5$, for actuating the condenser, a feeder, a walking-beam, and connections for positively actuating the same, and an additional arm, M, located in the path of the walking-beam and adapted to force it upward at the commencement of the forward motion of the follower, as set forth.

4. In a perpetual press, the sides B' B', re-enforced, as described, and provided with the projection Q, formed into a spindle adapted to carry the belt-wheel N, and apertured on its inner side to carry one end of the crank-shaft C, as described.

5. The combination, with a compressing-chamber, of a friction-chamber extending therefrom, said chamber having top and bottom pieces united and held in vertically-adjustable position by bolts E, controlling the relative positions thereof, and the laterally-adjustable gates $E^3$, hinged to the outer ends of said top and bottom pieces, substantially as shown and described.

6. The combination, with a compressing-chamber, of a friction-chamber extending therefrom, said chamber having solid top and bottom pieces formed with inwardly-extending flanges $d'$, vertical adjusting-bolts E, for uniting and controlling the relative positions of the top and bottom pieces, and the laterally-adjustable gates $E^3$, hinged to the outer ends of said top and bottom pieces, substantially as shown and described.

7. In a perpetual press, the combination, with the friction-chamber, of adjustable gates $E^3$, having inwardly-projecting flanges, the frame $E^4$, and a removable board, $E^5$, substantially as set forth.

In testimony whereof I hereto affix my signature in presence of two witnesses.

JOHN LA DOW.

Witnesses:
W. L. OSTROM,
F. P. BARNARD.

It is hereby certified that in Letters Patent No. 365,824, granted July 5, 1887, upon the application of John La Dow, of Trumansburg, New York, for an improvement in "Perpetual Cotton and Hay Presses," an error appears in the printed specification requiring correction, as follows: On page 3, line 53, the word "upward" should be stricken out and the word "*downward*" inserted instead; and that the Letters Patent should be read with this correction therein that the same may conform to the record of the case in the Patent Office.

Signed, countersigned, and sealed this 12th day of July, A. D. 1887.

[SEAL.]

D. L. HAWKINS,
*Acting Secretary of the Interior.*

Countersigned:

BENTON J. HALL,
*Commissioner of Patents.*